United States Patent
Schlarb et al.

(10) Patent No.: US 8,856,727 B2
(45) Date of Patent: Oct. 7, 2014

(54) GENERATION FRAMEWORK FOR MAPPING OF OBJECT MODELS IN A DEVELOPMENT ENVIRONMENT

(75) Inventors: Uwe Schlarb, Oestringen (DE); Hans-Juergen Hennrich, Gaiberg (DE); Daniel Niehoff, Sandhausen (DE); Stefan Baeuerle, Rauenberg-Rotenberg (DE); Daniel Figus, Wallduern (DE)

(73) Assignee: SAP SE, Walldorf (DE)

( * ) Notice: Subject to any disclaimer, the term of this patent is extended or adjusted under 35 U.S.C. 154(b) by 114 days.

(21) Appl. No.: 13/550,295

(22) Filed: Jul. 16, 2012

(65) Prior Publication Data

US 2014/0019934 A1    Jan. 16, 2014

(51) Int. Cl.
*G06F 9/44* (2006.01)

(52) U.S. Cl.
USPC ........... 717/104; 717/100; 717/101; 717/102; 717/103; 717/105; 707/754

(58) Field of Classification Search
None
See application file for complete search history.

(56) References Cited

U.S. PATENT DOCUMENTS

| | | | | |
|---|---|---|---|---|
| 7,225,424 | B2 * | 5/2007 | Cherdron et al. | 717/104 |
| 7,536,673 | B2 * | 5/2009 | Brendle et al. | 717/102 |
| 7,565,662 | B2 * | 7/2009 | Martin et al. | 719/318 |
| 2004/0133898 | A1 * | 7/2004 | Cherdron et al. | 719/332 |
| 2005/0021354 | A1 * | 1/2005 | Brendle et al. | 705/1 |
| 2006/0090165 | A1 * | 4/2006 | Martin et al. | 719/318 |
| 2008/0104140 | A1 * | 5/2008 | Vierich et al. | 707/202 |
| 2009/0037898 | A1 * | 2/2009 | Belisario et al. | 717/169 |
| 2009/0049422 | A1 * | 2/2009 | Hage et al. | 717/104 |
| 2009/0210857 | A1 * | 8/2009 | Martineau | 717/120 |
| 2010/0293530 | A1 * | 11/2010 | Ivancic et al. | 717/126 |
| 2011/0153624 | A1 * | 6/2011 | Aigner et al. | 707/754 |
| 2012/0030580 | A1 * | 2/2012 | Schlarb et al. | 715/741 |
| 2012/0131544 | A1 * | 5/2012 | Carbajales et al. | 717/105 |
| 2012/0166461 | A1 * | 6/2012 | Demant et al. | 707/758 |
| 2012/0166983 | A1 * | 6/2012 | Demant et al. | 715/764 |
| 2013/0031493 | A1 * | 1/2013 | Ritter et al. | 715/762 |
| 2013/0104100 | A1 * | 4/2013 | Mueller | 717/106 |
| 2013/0167110 | A1 * | 6/2013 | Gross et al. | 717/105 |
| 2013/0191820 | A1 * | 7/2013 | Jahr et al. | 717/170 |
| 2013/0198103 | A1 * | 8/2013 | Echter et al. | 705/342 |

* cited by examiner

*Primary Examiner* — Don Wong
*Assistant Examiner* — Roberto E Luna
(74) *Attorney, Agent, or Firm* — Mintz Levin Cohn Ferris Glovsky and Popeo, P.C.

(57) ABSTRACT

A delta handler can allow calculation of difference between an already generated set of backend entities and a set of new entities necessary to support a primary object affected by a change made in a development environment supporting extensions to a backend model of a software architecture. Improved stability and robustness can be provided via an approach in which a target list of activities relating to creating, changing, or deleting of entities in backend repositories necessary to support the affected primary object is created and a sequence for performance of the activities in the target list is determined in a manner that can allow handling of such activities in a unified manner rather than on a per object type basis. Related methods, systems, articles of manufacture, and the like are described.

17 Claims, 8 Drawing Sheets

```
import AP.Common.GDT as apCommonGDT;

businessobject CustomerAddress MyNewBO{
    element Field_1 : string;
    element Field_2 : string;

node Item [0..1]{
        element Field_a : string;
        element Field_b : string;

node AnotherNode [0..1]{
        element Field_x : string;
        element Field_y : string;
    }
}
```

GENERATION FRAMEWORK FOR MAPPING OF OBJECT MODELS IN A DEVELOPMENT ENVIRONMENT

TECHNICAL FIELD

The subject matter described herein relates to mapping of object modules in a development environment.

BACKGROUND

Various software architectures, particularly database systems such as enterprise resource management (ERP) applications, other business software packages, and the like that are targeted at supporting organization-specific business processes of a customer organization that purchases or licenses the use of such a software architecture, can include a development environment offered to partners developers to enable the development of add-ons to the core software platform of the software architecture. Such add-ons can generate additional revenue for a vendor of the main software architecture, both through licensing or sales fees that can be charged to partner developers and by facilitating the development of a wider range of solutions that can appeal to niche groups of potential customer organizations.

SUMMARY

Implementations of the current subject matter can facilitate easier consumption for business partners of a backend model of a software architecture via an extension environment. For example, a list of entities required in the backend model to support a primary object affected by a change made in the development environment can be compared with content stored in an object mapping repository accessible to the backend model, which can, in addition to other possible advantages, create a target list of activities relating to creating, changing, or deleting of entities in backend repositories necessary to support the affected primary object and also to determine a sequence for performance of the activities in the target list. The target list and a status the performance of activities in the target list can be stored, for example in the object mapping repository.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To allow easy consumption for a partner the object model exposed in a development environment of a business software architecture or other database system (generically referred to herein as a database system) can typically differ from the object model in the backend, for example the object model defined within the application server to support use by users at a customer organization that has purchased or licensed a software architecture from a software architecture vendor for use by its members (e.g. employees, staff, consultants, etc.) in support of business processes that are associated with business activities of the customer organization. As discussed in greater detail in the following paragraphs, differences between the exposed object model in a development environment and that in the backend of a database system can require mapping between the two object models, which can added undesirable complications a number of tasks associated with maintenance of a well-functioning database system. For example, one or more of handling of change scenarios, deletion of objects, adaptations to architectural changes, performance of the generation process, and the like can be impacted by conventional approaches to supporting a development environment that rely upon an exposed object model that differs from the backend object model that supports normal functions of the database system.

Figure 1:
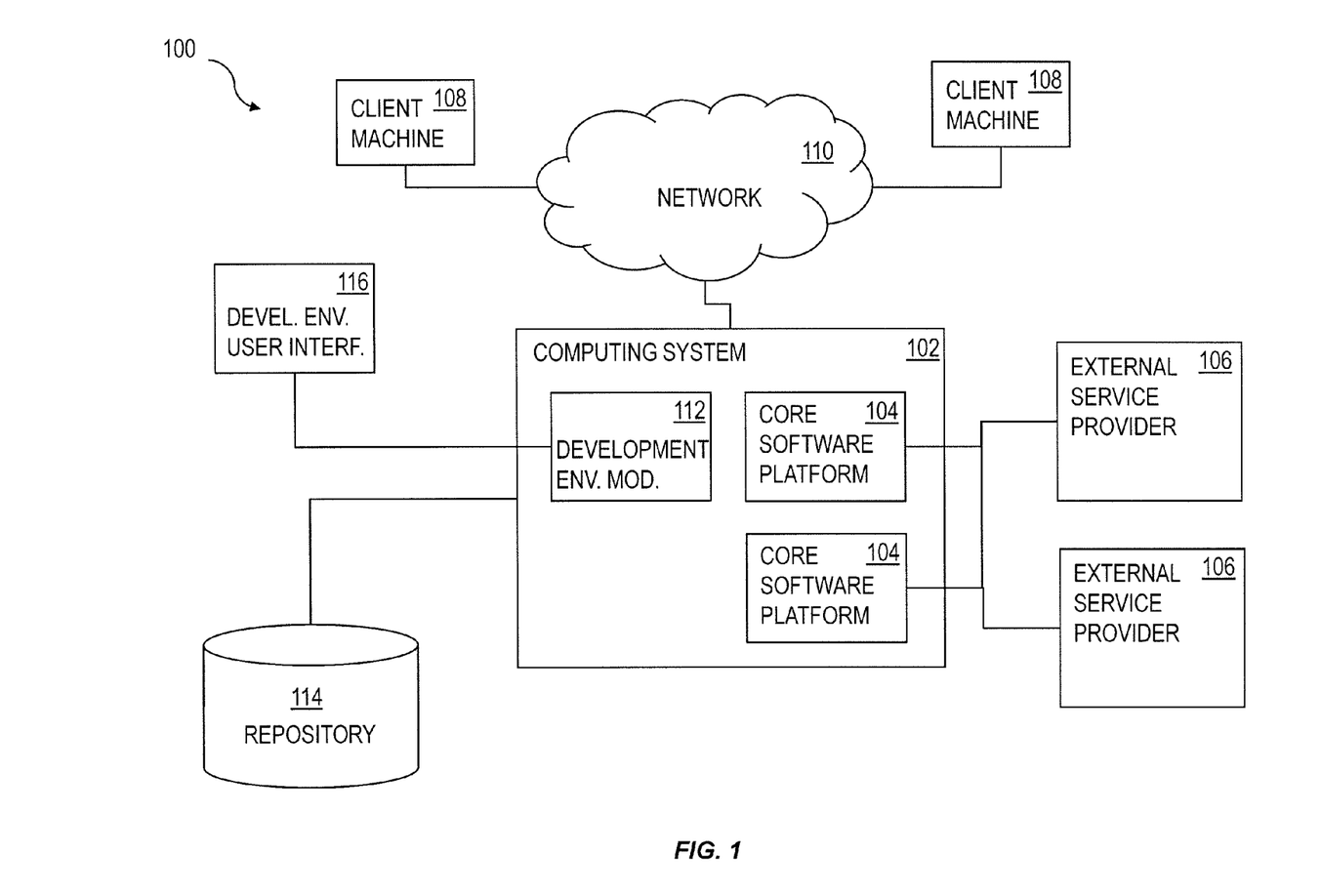
FIG. 1 is a diagram illustrating aspects of an example of a software architecture showing features consistent with implementations of the current subject matter.

The core software platform of an enterprise resource planning (ERP) system, other business software architecture, or other database functionality can in some implementations be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram of a system consistent with such an implementation. A computing system 102 can include one or more core software platform modules 104 providing one or more features of the business software system. In some implementations, the computing system 102 can be an application server. The computing system 102 can also aggregate or otherwise provide a gateway via which users can access functionality provided by one or more external service providers 106. Examples of external service providers 106 can include one or more computing systems supporting database functionality or other software functionality created or provided from a partner or other third party software developer. This external service provider database functionality or other software functionality can be provided over either direct or networked connections if the one or more external provider computing systems are separate from the computing system 102 that includes one or more core software platform modules 104. Alternatively, the external service provider database functionality or other software functionality can be hosted on the computing system 102 that includes the one or more core software platform modules 104.

Client machines 108 can access the computing system, either via a direct connection, a local terminal, or over a network 110 (e.g. a local area network, a wide area network, a wireless network, the Internet, or the like). The computing system 102, or optionally a separate system associated with the computing system, can include a development environment module 112 that can provide or otherwise support functionality consistent with the descriptions below in relation to a development environment for creation of extensions or other customizations to the core software platform of the database system.

The computing system 102 can also have access one or more repositories 114 that can store metadata and/or data in the form of objects or other elements, such as for example business objects, metadata objects, tables or the like. These objects or other elements can include definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. Metadata consistent with other definitions can also be stored in a persistent manner in the repository 114. In some implementations, a business object or other metadata object can include a template definition of a standard business process or other related functionality. The template definition can optionally be modified via one or more extensions that can also be stored in the one or more repositories 114. Such extensions can be modified, created, updated, deleted, etc. through the use of a development environment module 112, which can optionally provide server-side support for a user interface 116 via which a developer can perform development environment operations.

Smaller organizations can also benefit from use of business software functionality. However, such an organization may lack the necessary hardware resources, IT support, and/or consulting budget necessary to make use of a standalone business software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 2:
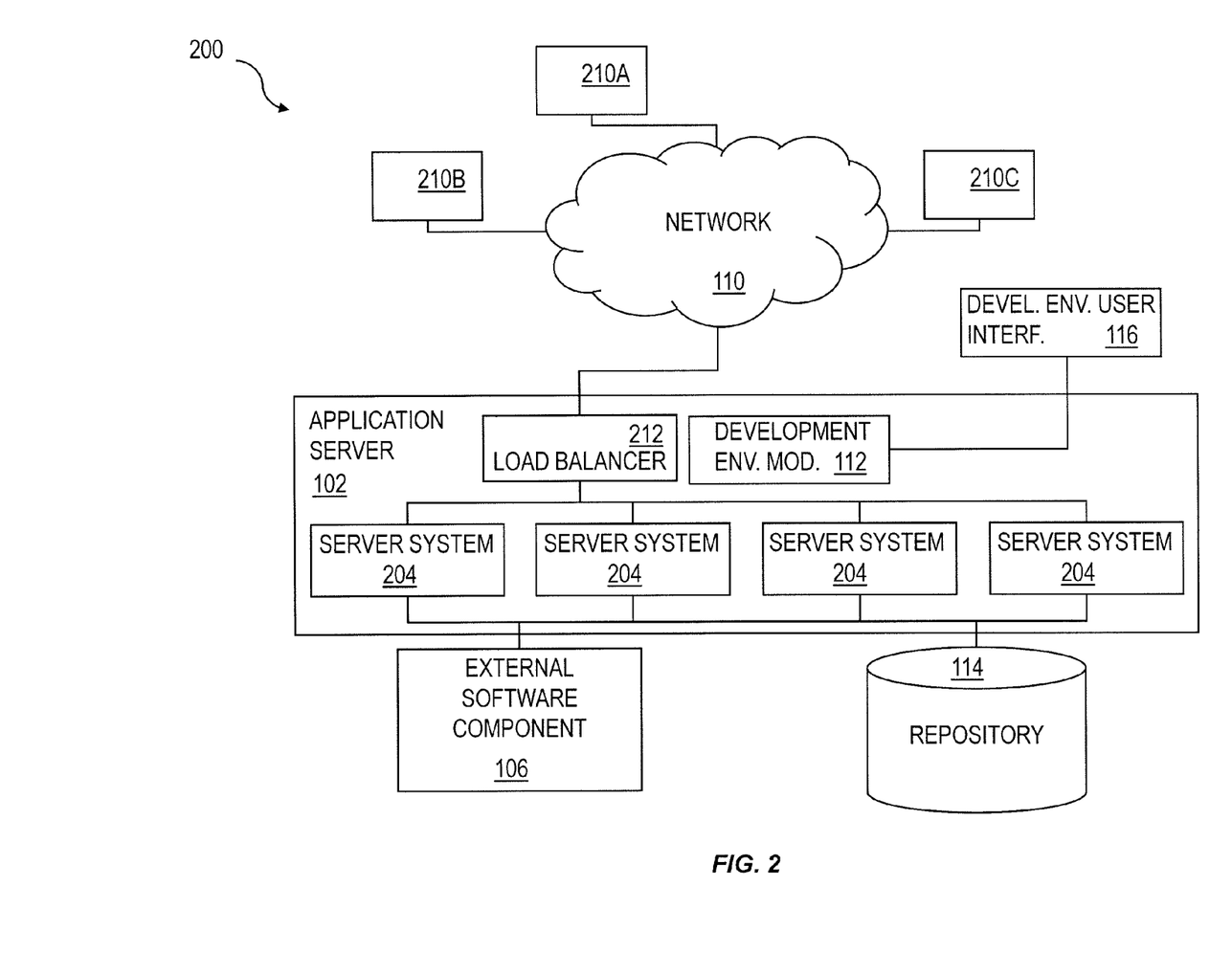
FIG. 2 is a diagram illustrating aspects of another example of a software architecture showing features consistent with implementations of the current subject matter.

FIG. 2 shows a block diagram of a multi-tenant implementation of a software delivery architecture 200 that includes an application server 202, which can in some implementations include multiple server systems 204 that are accessible over a network 206 from client machines operated by users at each of multiple organizations 210A-210C (referred to herein as "tenants" of a multi-tenant system) supported by a single software delivery architecture 200. For a system in which the application server 202 includes multiple server systems 204, the application server can include a load balancer 212 to distribute requests and actions from users at the one or more organizations 210A-210C to the one or more server systems 204. Instances of the core software platform 104 (not shown in FIG. 2) can be executed in a distributed manner across the server systems 204. A user can access the software delivery architecture across the network using a thin client, such as for example a web browser or the like, or other portal software running on a client machine. The application server 202 can access data and data objects stored in one or more data repositories 116 and can include or have access to a buffer 112 that retains, in a rapidly accessibly storage medium or persistency, metadata, metadata objects (e.g. business objects and the like), etc. for use by at least one of the one or more core software platform modules 104 and the database functionality or other software functionality provided by one or more external service providers 106. The application server 202 can also serve as a middleware component via which access is provided to one or more external software components 106 that can be provided by third party developers.

The application server 202, or optionally a separate system associated with the computing system, can include a development environment module 112 that can provide or otherwise support functionality consistent with the descriptions below in relation to a development environment for creation of extensions or other customizations to the core software platform of the database system.

The application server 202 can also have access one or more repositories 114 that can store metadata and/or data in the form of objects or other elements, such as for example business objects, metadata objects, tables or the like. These objects or other elements can include definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. Metadata consistent with other definitions can also be stored in a persistent manner in the repository 114. In some implementations, a business object or other metadata object can include a template definition of a standard business process or other related functionality. The template definition can optionally be modified via one or more extensions that can also be stored in the one or more repositories 114. Such extensions can be modified, created, updated, deleted, etc. through the use of a development environment module 112, which can optionally provide server-side support for a user interface 116 via which a developer can perform development environment operations.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 202 that includes multiple server systems 204 that handle processing loads distributed by a load balancer 212. Potential benefits from such an arrangement can include, but are not limited to, high and reliably continuous application server availability and minimization of unplanned downtime, phased updating of the multiple server systems 204 to permit continuous availability (one server system 204 can be taken offline while the other systems continue to provide services via the load balancer 212), scalability via addition or removal of a server system 204 that is accessed via the load balancer 212, and de-coupled lifecycle management events or processes (such as for example system maintenance, software upgrades, etc.) that enable updating of the core software independently of tenant-specific customizations implemented by individual tenants.

As in the example illustrated in FIG. 1, the repository 114 can store a business object that represents a template definition of a standard business process. Each individual tenant 210A-210C can customize that standard template according to the individual business process features specific to business of the organization to which that tenant is assigned. Customizations can be stored as extensions in the metadata repository.

Figure 3:
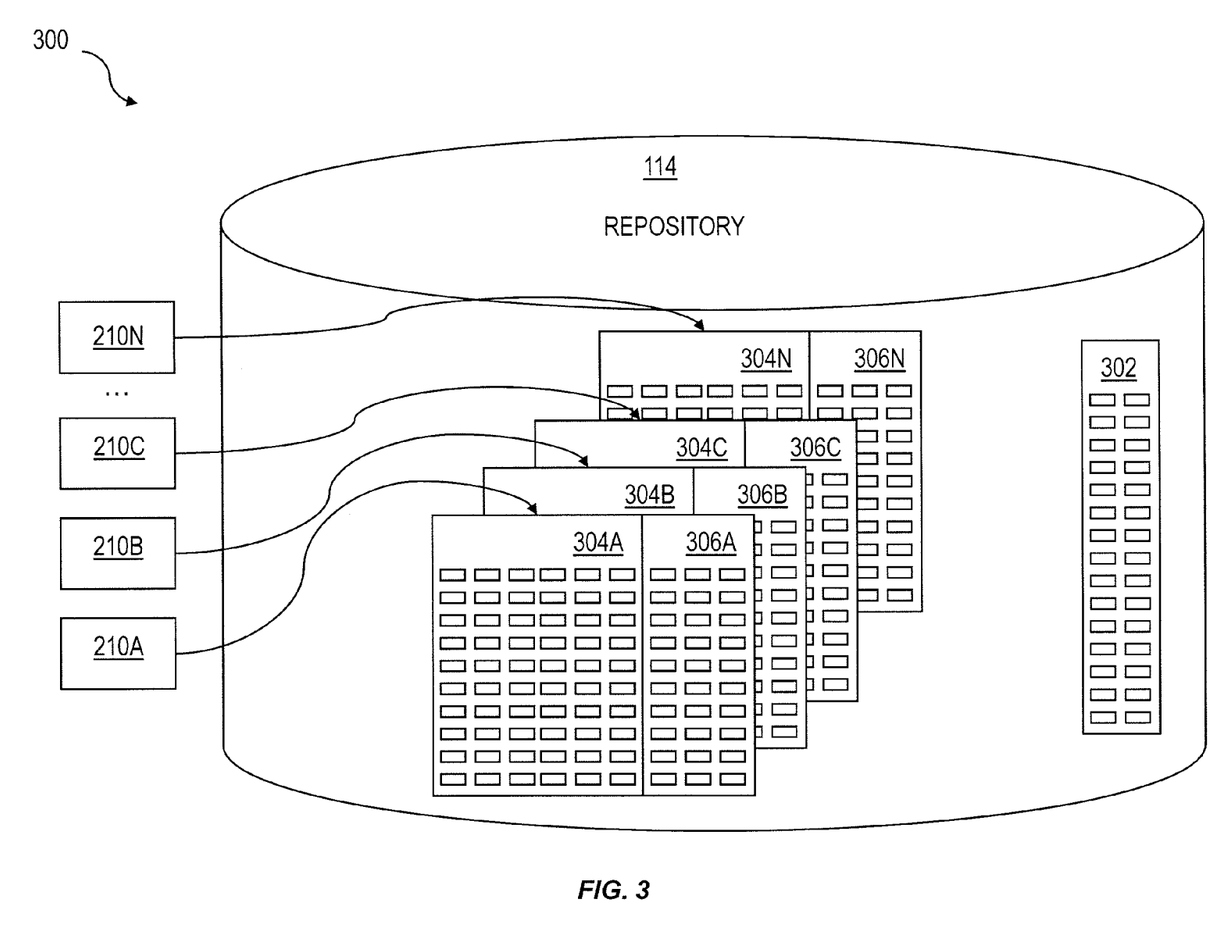
FIG. 3 is a diagram illustrating aspects of a repository showing features consistent with implementations of the current subject matter.

To provide for customization of the business process for each of multiple organizations supported by a single software delivery architecture 200, the data and data objects stored in the repository 114 and/or other data repositories that are accessed by the application server 202 can include three types of content as shown in FIG. 3: core software platform content 302 (e.g. a standard definition of a business process), system content 304, and tenant content 306. Core software platform content 302 includes content that represents core functionality and is not modifiable by a tenant. System content 304 can in some examples be created by the runtime of the core software platform and can include core data objects that store concrete data associated with specific instances of a given business process and that are modifiable with data provided by each tenant. Metadata relating to one or more of core software platform content 302, system content 304, and content provided by the one or more external service providers 106 can optionally be part of a system tenant that is accessible from all other tenants 210A-210N.

The data and/or the metadata retained in the tenant content 306 can be tenant-specific: for example, each tenant 210A-210N can store information about its own inventory, sales orders, etc. as well as metadata pertaining to extensions, processes, or the like that are specific to the organization assigned to that tenant. Tenant content 306A-306N can therefore include data objects or extensions to other data objects that are customized for one specific tenant 210A-210N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 306 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 302 and system content 304 and tenant content 306 of a specific tenant are accessed to provide the business process definition and/or the status information relating to a specific instance of the business process according to customizations and business data of that tenant such that each tenant is provided access to a customized solution whose data are available only to users from that tenant.

Figure 4:
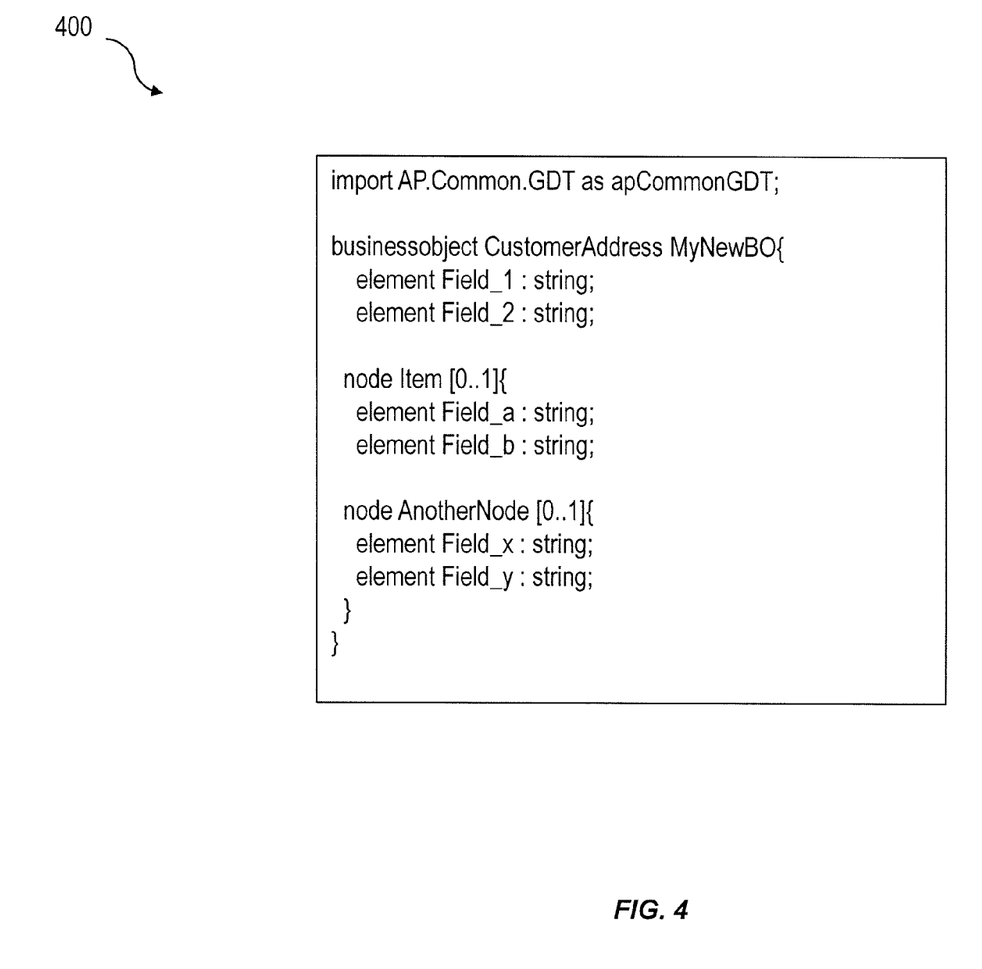
FIG. 4 is a script file listing showing an example of a description of a structure of a business object or other data object.

FIG. 4 shows an example of a script file 400 describing a structure of a business object or other data object. Such a script file can be used in modeling a business object for use in a development environment and can be a primary entity stored in a repository and transported. On activation, a script file 400 or other software-based functionality can be mapped to a backend object model 502 in the backend of the database system.

Figure 5:
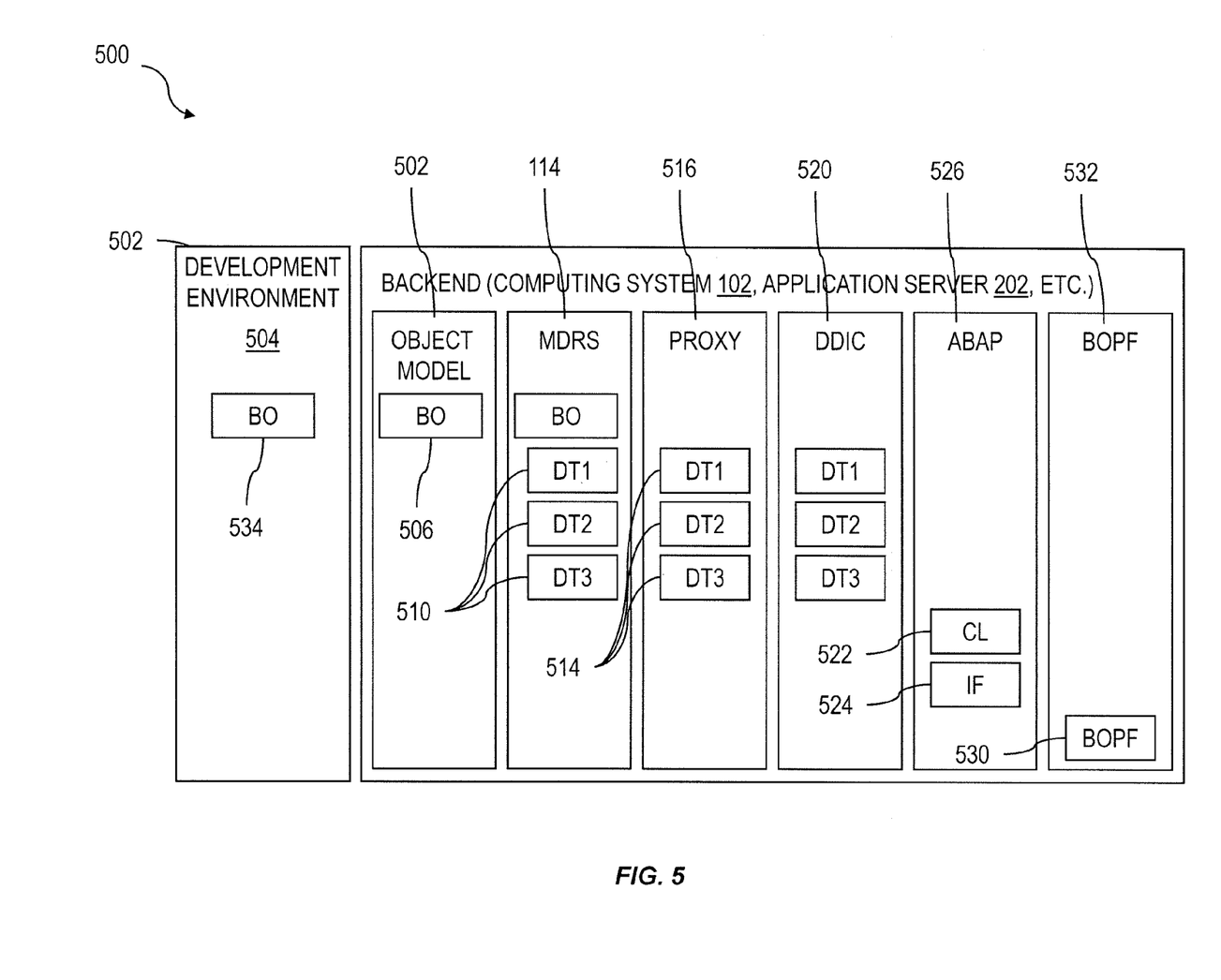
FIG. 5 is a diagram illustrating aspects relating to an example of mapping requirements between a development environment and a backend model.

The example script file 400 shown in FIG. 4 can cause the creation of the objects shown in FIG. 5, which shows a mapping diagram 500 illustrating an example of object mapping between a development environment 504 and a backend object model 502. Execution of the example script file 400 can cause creation of a business object model 506 in a metadata repository system (MDRS) 114, data type definitions 510 (in this example three data type definitions are created, but this is merely presented as an example) in the MDRS 114, proxy data types 514 for the data definitions created in a proxy server 516 (the proxy data types can optionally alternatively or additionally be created in a data dictionary or DDIC 520), a programming language class 522 and programming language interface 524 (for example, the class and interface can be created using ABAP 526, the Advanced Business Application Programming language), and a processing framework model 530 (for example, using a BOPF or business object processing framework 532). A model mapping between development model primary entities 534 (for example one or more business objects) in the development environment 504 and the secondary entities in the backend occurs for many objects in the development environment 504, potentially including but not limited to business configurations, Web Services, business subject extensions, and the like.

In a conventional development environment, each object type can handle object model mapping individually. This approach can lead to various difficulties. As an illustrative but non-limiting example, a definition of a sample business object can contain multiple (e.g. three) nodes. On activation, the created data types 510 can contain the fields of the nodes as shown in FIG. 5. In an example illustrated in the mapping diagram 600 of FIG. 6, a field is added to the first node and another node is renamed (for example node 3 becomes node 4) through use of the development environment 504. A set of changes must in turn be applied to the corresponding entities in the backend of the database system. For example, the business object model 506 in the MDRS or other repository 114 must be changed, and the data types 510 must be adapted to a new set of data types 610, which can also be reflected in a new set of proxy data types 614 and also in the data dictionary 520. For example, first data type 510 is changed to a new first data type 610 by adding a field (indicated as "Δ DT1 in FIG. 6), a third data type 510 (DT3) is deleted (indicated with cross-hatching in FIG. 6), and a new (fourth) data type 610 is created. In this example, the second data type (DT2) remains unchanged. However, the programming language class 522 and programming language interface 524 are changed to new programming language class 622 and new programming language interface 524, respectively, and the processing framework model 530 is changed to a new processing framework model 630.

Figure 6:
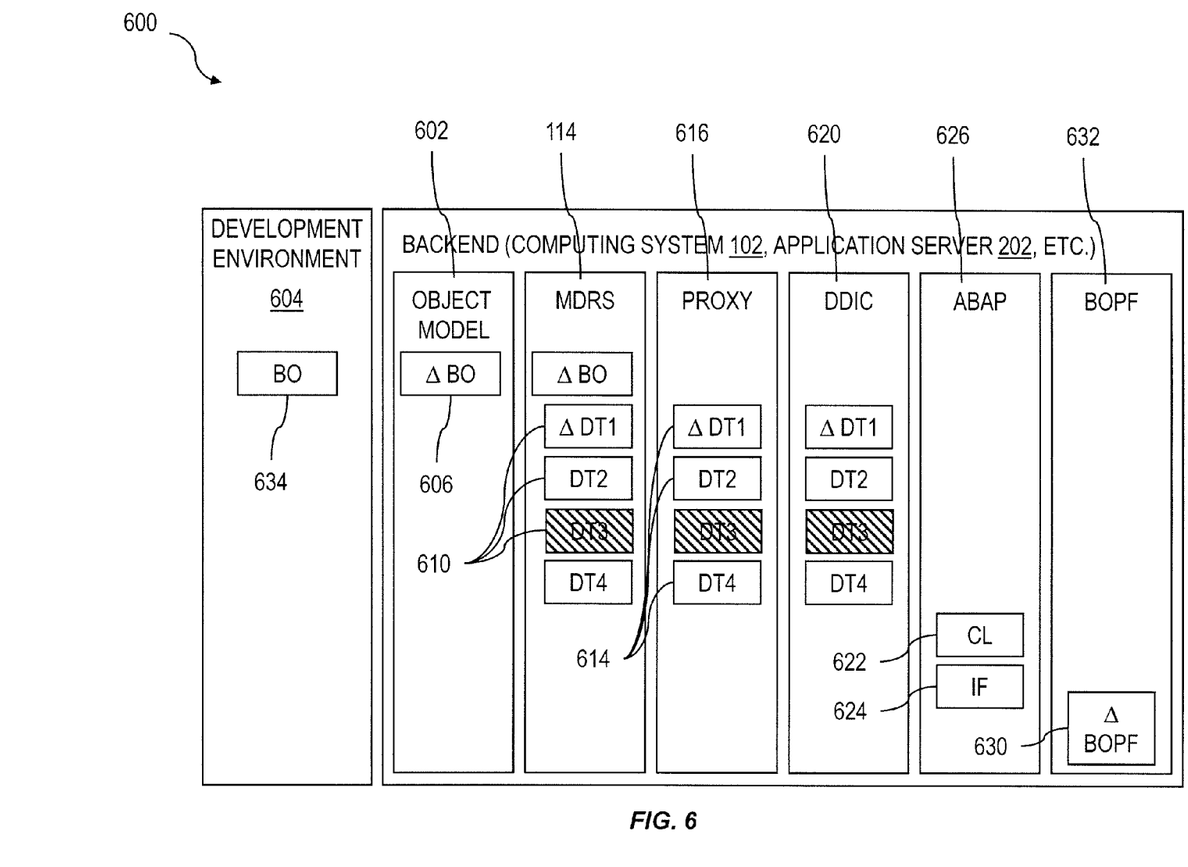
FIG. 6 is a diagram illustrating aspects relating to an example of mapping requirements between a development environment and a backend model in which changes in the development environment are propagated to the backend model.

As illustrated by comparison between FIG. 5 and FIG. 6, generation of changes in a development environment 504 requires calculation and application of a set of deltas to the backend object model 502. In a conventional development environment, delta handling is either not implemented at all or only individually implemented in for each object type in the development environment 504. This approach can lead to a certain degree of fragility. For example, it is quite possible to wind up with orphaned objects in the backend object model that are inadvertently never deleted despite their failure to map to any corresponding feature in the development environment.

Figure 7:
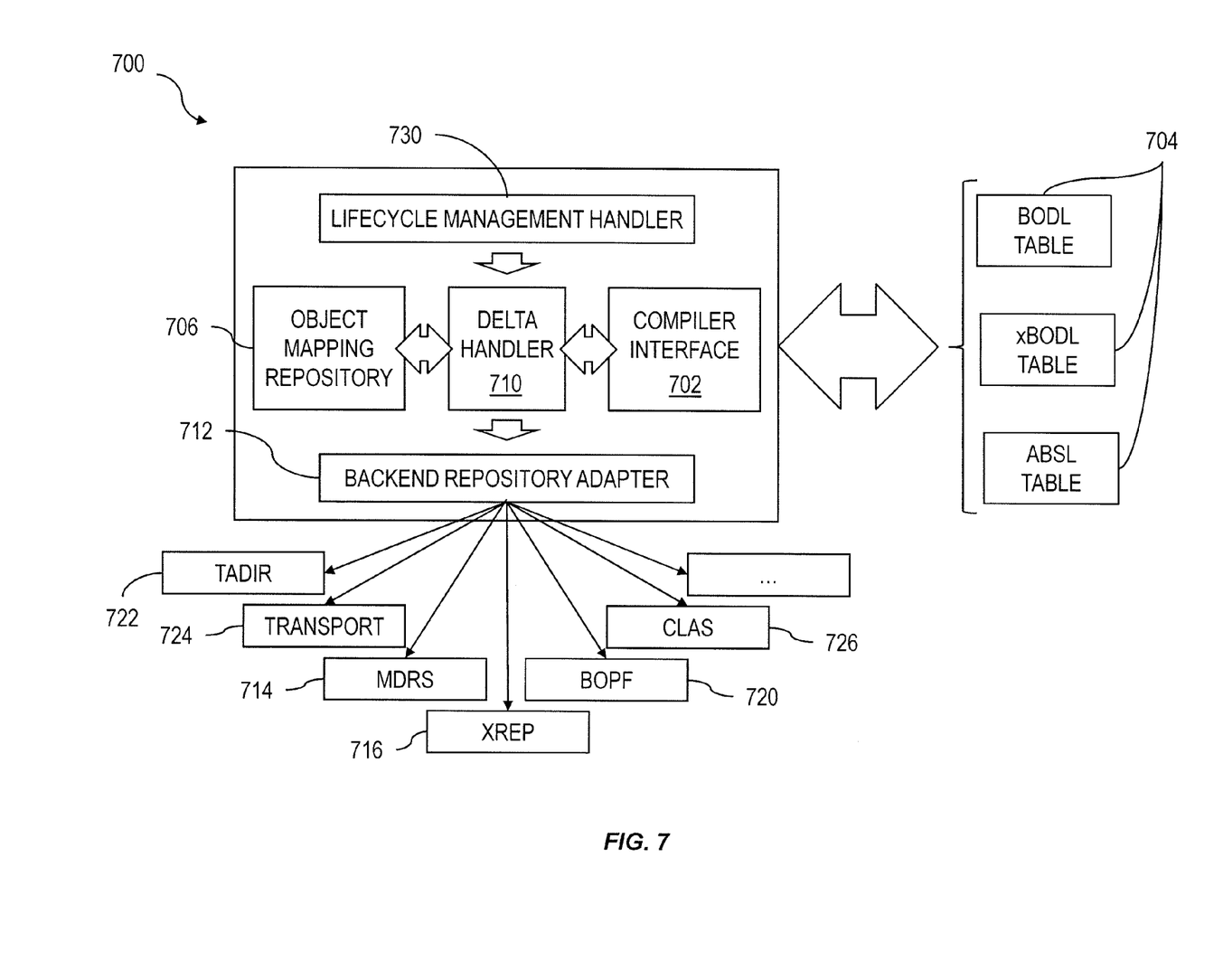
FIG. 7 is a diagram of a generation framework illustrating features consistent with one or more implementations of the current subject matter.

Implementations of the current subject matter can provide one or more features that can improve upon existing development environments, for example by providing a framework capable of handling a variety of potential object mapping issues in a generic way. As illustrated in the diagram of a generation framework 700 shown in FIG. 7, a compiler interface 702, an object mapping repository 704, a delta handler 706, a backend repository handler 710, and a lifecycle management handler 712 can be included as part of the functionality providing consistent with one or more implementations of the current subject matter. A generation framework 700 as shown in FIG. 7 can optionally be part of a development environment module 112 such as is described above in reference to FIG. 1 and FIG. 2.

A compiler interface 702 can support the underlying operation of the generation framework 700. Each primary object type in the development environment 504 can link to or otherwise communicate with the compiler interface 702, which can receive as input the data of a primary object. The data of a primary object can include, for example, content of a script file describing a business object or the like. The compiler interface 702 can provide as output one or more object mapping tables 704, which can for example include a table of backend entities (including their data) which represent the primary object in the backend object model. The one or more object mapping tables 704 can include, but are not limited to advanced business scripting language (ABSL) tables, business object description language (BODL) tables, extension business object description language (xBODL) tables, etc.

An object mapping repository 706 can store the results generated by the compiler interface 702 for each primary object. The status of the generation of these results can also optionally be stored in the object mapping repository 706. A delta handler 710 can be used to ascertain differences between the existing, already generated objects in the backend object model and the new state of the backend object model being generated by use of the development environment.

A backend repository adapter 712 can serve as an interface to existing repositories 114, which can include one or more of a MDRS repository 714, a XRep repository 716, a BOPF repository 720, an object directory (e.g. such as TADIR) 722, a transport object repository 724, a repository for transport objects for advanced business application programming object orientation (ABAP OO) classes (CLAS) 726, and the like. The backend repository adapter 710 can facilitate creation, deletion, and updating of objects in these repositories.

Figure 8:
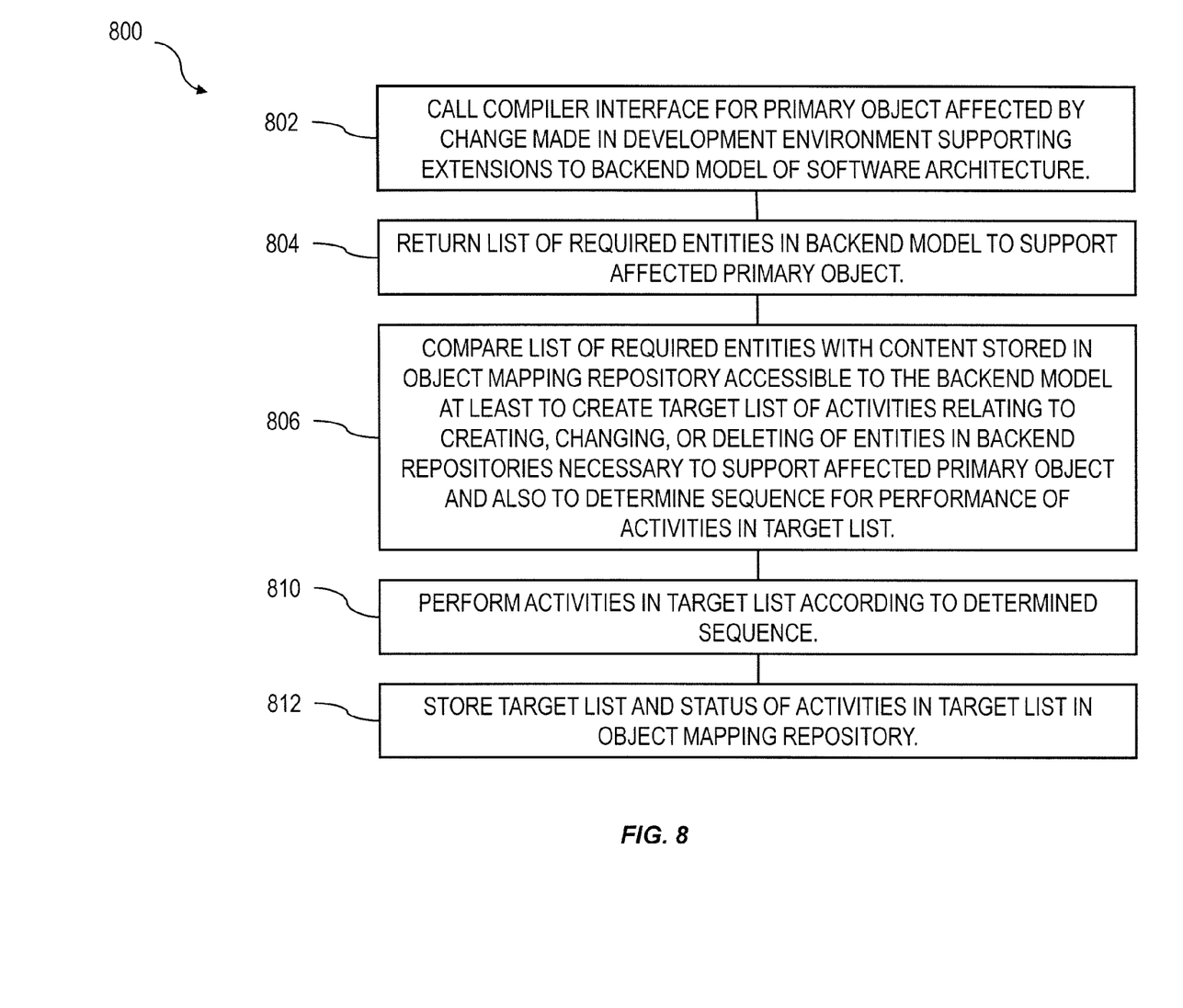
FIG. 8 is a process flow diagram illustrating aspects of a method having one or more features consistent with implementations of the current subject matter.

A life cycle management handler 730 can serve as a central component of the generation framework 700, and can be invoked at each life cycle event. FIG. 8 shows a process flow chart 800 one or more features consistent with operation of implementations of the current subject matter. At 802, a compiler interface 702 can be called, optionally by a life cycle management handler 730, for a primary object affected by a change made in a development environment. The compiler interface 702 can return the list of entities that are required in a backend model to support the affected primary object at 804. At 806, this list of required entities can be compared with content in an object mapping repository 706, for example via a delta handler 710. The comparing can include creating a target list of activities (e.g. creating, changing, deleting, etc. of entities in one or more backend repositories 114) to support the affected primary object and determining a sequence for performance of the activities in the target list. The target list of activities can optionally be passed to the backend repository adapter 712, which can at 810 perform the necessary operations to result in the creating, changing, or deleting of the entities in the one or more backend repositories 114. The target list including the status of creating, changing, or deleting activities can be stored at 812 in the object mapping repository 706.

The stored target list can be accessed from the object mapping repository 706 in the event that an error or other interruption occurs. For example, using the stored target list, it is possible to determine a point in time at which the necessary operations to result in creating, changing, or deleting of the entities in the one or more backend repositories operation might have failed. The performing of the necessary operations can be restarted at this point once the error has been corrected or otherwise addressed.

While the foregoing description of method features refer to specific aspects of an architecture illustrated in FIG. 7, other functionality implemented in one or more of software and hardware can replace any or all of the specific data or processing structures discussed above and shown in FIG. 7.

Deleting an object using a conventional approach can be complicated because entities in the backend model typically must be completely deleted and also typically must be deleted in a correct order (e.g. it is generally not possible to delete a data type when that data type is still used by an existing business object). Knowing or determining which entities in the backend model must be deleted can be a non-trivial exercise because doing so can require knowledge about the list of created entities. In conventional approaches that generally lack a persistency for storing the list of entities, this process can be problematic.

For example, in conventional development environments, an object list might not be stored at all because the set of objects is simply hard coded. In other cases, the object list can be read from the generated object model. Such approaches can lead to a certain fragility, at least because an error in the generation may lead to a corrupt object model and thus the object list may not be readable anymore. In contrast, an approach consistent with implementations of the current subject matter can include a delta handler 710 comparing a list from an object mapping repository 706 with an empty list upon deletion of a primary object in the development environment. As a result, all entities will be deleted.

Another aspect of deletions can be the correct handling of transports and TADIR entries (e.g. TADIR entries are removed when the transport order is released). This can be implemented centrally as well using features consistent with implementations of the current subject matter. At least when a backend model is changed due to an architectural redesign, this approach can be beneficial.

For example, a logic extension for a business object can lead to the generation of one or more extension framework extensions. After a system upgrade, a new version of an enterprise services framework (ESF) can receive a migrated business object created in a prior version of the ESF. Such a business object can now be extended via extensions of the new ESF version (since the prior ESF framework version is no longer available). As a result, existing extensions to the business object in a development environment may need to be regenerated, for example by deleting extensions created in the prior version of the ESF and creating new extensions in the new version of the ESF.

In a conventional development environment, the handling of the regeneration due to architectural changes can generally be solved individually per object type and architectural change. This approach can be quite cumbersome and prone to creation and propagation of errors. In contrast, consistent with implementations of the current subject matter, a new set of entities in the backend model can be returned via a compiler interface 702. A comparison with the existing list of entities from an object mapping repository 706 can reveal the extensions created in the prior version of the ESF that need to be deleted and the new extensions that need to be created in the new version of the ESF.

When a primary object (or a set of primary objects) is changed in the development environment, the corresponding generation of entities in the backend model can be very time consuming. Therefore, a performance optimization can be desirable which only touches those objects in the ABAP backend that need to be created, changed or deleted. In a conventional development environment approach, delta handling is typically only partially implemented and solved individually per object type. In contrast, consistent with implementations of the current subject matter, a delta handler 710 can be capable of supporting a performance optimization because a delta can be calculated as part of operation of the generation framework 700.

When an error occurs it can be important to perform an error analysis to determine which entities (e.g. objects or other data structures in the backend model) have been generated as representatives for a primary object in the development environment. Doing so can enable a closer examination of the generated entities in the backend model, for example using a native MDRS editor or the like, to diagnose and hopefully correct the cause of an error. In a conventional development environment approach, individual mapping of a primary object to entities in the backend model is typically not completely available. For example, only an overall list for the whole component may be available. In contrast, consistent with implementations of the current subject matter, a list of entities generated in the backend model as representatives for the affected primary object in the development environment can be derived from an object mapping repository 704.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory machine-readable medium storing instructions that, when executed by at least one programmable processor, cause the at least one programmable processor to perform operations comprising:
   calling a compiler interface for a primary object affected by a change made in a development environment supporting extensions to a backend model of a software architecture;
   returning, by the compiler interface, a list of required entities in the backend model to support the primary object, the list of required entities comprising content of the primary object;
   ascertaining deltas between the content of the primary object from the list of required entities and pre-existing content stored in an object mapping repository accessible to the backend model, the ascertaining comprising comparing, using a delta handler, the content of the primary object from the list of required entities and the pre-existing content stored in the object mapping repository;
   creating, based at least on the ascertained deltas, a target list of activities necessary to update the pre-existing content to match the content of the primary object, the creating further comprising determining a sequence for performance of the activities in the target list, wherein the activities comprise at least one of creating, changing, or deleting of entities in one or more backend repositories necessary to support the primary object;
   performing the activities in the target list according to the determined sequence; and
   storing the target list along with a status of the activities in the target list in the object mapping repository.

2. The computer program product as in claim 1, wherein the comparing of the list of required entities comprises comparing the object mapping repository with an empty list when the primary object is deleted in the development environment.

3. The computer program product as in claim 1, wherein the operations further comprise: performing an error analysis in response to occurrence of an error, the diagnosing comprising deriving, from the object mapping repository, a list of entities generated in the backend model as representatives for the primary object in the development environment.

4. The computer program product as in claim 1, wherein the operations further comprise:
   determining, using the target list stored in the object mapping repository, a point in time at which the necessary operations to result in creating, changing, or deleting of the entities in the one or more backend repositories operation has failed due to an error or other interruption; and
   restarting the performing of the necessary operations at the point once the error or other interruption has been corrected.

5. The computer program product as in claim 1, wherein the change made in the development environment comprises a logic extension to the primary object as part of a migration from a prior version of an enterprise services framework to a new version of the enterprise services framework, the migration causing generation of at least one extension to the prior enterprise services framework, the primary object being extended via the logic extension, which requires a regeneration of extensions to the primary object that were previously created in the prior enterprise services framework, the regeneration comprising deleting extensions created in the prior version of the enterprise services framework and creating new extensions in the new version of the enterprise services framework.

6. A system comprising:
   at least one programmable processor; and
   a machine-readable medium storing instructions that, when executed by the at least one processor, cause the at least one programmable processor to perform operations comprising:
   calling a compiler interface for a primary object affected by a change made in a development environment supporting extensions to a backend model of a software architecture;
   returning, by the compiler interface, a list of required entities in the backend model to support the primary object, the list of required entities comprising content of the primary object;
   ascertaining deltas between the content of the primary object from the list of required entities and pre-existing content stored in an object mapping repository accessible to the backend model, the ascertaining comprising comparing, using a delta handler, the content of the primary object from the list of required entities and the pre-existing content stored in the object mapping repository;
   creating, based at least on the ascertained deltas, a target list of activities necessary to update the pre-existing content to match the content of the primary object, the creating further comprising determining sequence for performance of the activities in the target list wherein the activities comprise at least one of creating, changing, or deleting of entities in one or more backend repositories necessary to support the primary object;
   performing the activities in the target list according to the determined sequence; and
   storing the target list along with a status of the activities in the target list in the object mapping repository.

7. The system as in claim 6, wherein the comparing of the list of required entities comprises comparing the object mapping repository with an empty list when the primary object is deleted in the development environment.

8. The system as in claim 6, wherein the operations further comprise: performing an error analysis in response to occurrence of an error, the diagnosing comprising deriving, from the object mapping repository, a list of entities generated in the backend model as representatives for the primary object in the development environment.

9. The system as in claim 6, wherein the operations further comprise:
   determining, using the target list stored in the object mapping repository, a point in time at which the necessary operations to result in creating, changing, or deleting of the entities in the one or more backend repositories operation has failed due to an error or other interruption; and
   restarting the performing of the necessary operations at the point once the error or other interruption has been corrected.

10. The system as in claim 6, wherein the change made in the development environment comprises a logic extension to the primary object as part of a migration from a prior version of an enterprise services framework to a new version of the enterprise services framework, the migration causing generation of at least one extension to the prior enterprise services framework, the primary object being extended via the logic extension, which requires a regeneration of extensions to the primary object that were previously created in the prior enterprise services framework, the regeneration comprising deleting extensions created in the prior version of the enterprise services framework and creating new extensions in the new version of the enterprise services framework.

11. A computer-implemented method comprising:
   calling a compiler interface for a primary object affected by a change made in a development environment supporting extensions to a backend model of a software architecture;
   returning, by the compiler interface, a list of required entities in the backend model to support the primary object, the list of required entities comprising content of the primary object;
   ascertaining deltas between the content of the primary object from the list of required entities and pre-existing content stored in an object mapping repository accessible to the backend model, the ascertaining comprising comparing, using a delta handler, the content of the primary object from the list of required entities and the pre-existing content stored in the object mapping repository;
   creating, based at least on the ascertained deltas, a target list of activities necessary to update the pre-existing content to match the content of the primary object, the creating further comprising determining a sequence for performance of the activities in the target list, wherein the activities comprise at least one of creating, changing, or deleting of entities in one or more backend repositories necessary to support the primary object;
   performing the activities in the target list according to the determined sequence; and
   storing the target list along with a status of the activities in the target list in the object mapping repository.

12. The computer-implemented method as in claim 11, wherein the comparing of the list of required entities comprises comparing the object mapping repository with an empty list when the primary object is deleted in the development environment.

13. The computer-implemented method as in claim 11, further comprising: performing an error analysis in response to occurrence of an error, the diagnosing comprising deriving, from the object mapping repository, a list of entities generated in the backend model as representatives for the primary object in the development environment.

14. The computer-implemented method as in claim 11, further comprising:
   determining, using the target list stored in the object mapping repository, a point in time at which the necessary operations to result in creating, changing, or deleting of the entities in the one or more backend repositories operation has failed due to an error or other interruption; and
   restarting the performing of the necessary operations at the point once the error or other interruption has been corrected.

15. The computer-implemented method as in claim 11, wherein the change made in the development environment comprises a logic extension to the primary object as part of a migration from a prior version of an enterprise services framework to a new version of the enterprise services framework, the migration causing generation of at least one extension to the prior enterprise services framework, the primary object being extended via the logic extension, which requires a regeneration of extensions to the primary object that were previously created in the prior enterprise services framework, the regeneration comprising deleting extensions created in the prior version of the enterprise services framework and creating new extensions in the new version of the enterprise services framework.

16. The computer-implemented method as in claim 11, wherein at least one of the calling, the returning, the comparing, the performing, and the storing is performed by at least one programmable processor.

17. The computer program product as in claim 1, wherein the delta handler handles multiple activities in a unified manner.

* * * * *